United States Patent
Rose

(10) Patent No.: US 7,420,970 B2
(45) Date of Patent: Sep. 2, 2008

(54) READ PORTS AND METHODS OF OUTPUTTING DATA VIA READ PORTS

(75) Inventor: Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 1043 days.

(21) Appl. No.: 10/461,879

(22) Filed: Jun. 16, 2003

(65) Prior Publication Data

US 2004/0252728 A1    Dec. 16, 2004

(51) Int. Cl.
*H04Q 11/00*  (2006.01)
*H04J 3/04*   (2006.01)

(52) U.S. Cl. .................. 370/388; 370/420; 370/536
(58) Field of Classification Search .............. None
See application file for complete search history.

(56) References Cited

U.S. PATENT DOCUMENTS

| | | | | |
|---|---|---|---|---|
| 4,908,818 A * | 3/1990 | Kawano | ..................... | 370/217 |
| 6,665,319 B1 * | 12/2003 | Bergaire et al. | ............ | 370/535 |
| 6,697,386 B2 * | 2/2004 | Sugawara et al. | ........... | 370/535 |
| 7,145,903 B2 * | 12/2006 | Gutierrez | ..................... | 370/362 |
| 7,215,673 B2 * | 5/2007 | Kosonen et al. | .......... | 370/395.1 |
| 7,239,652 B2 * | 7/2007 | Parhi | .......................... | 370/535 |

* cited by examiner

*Primary Examiner*—Melanie Jagannathan
(74) *Attorney, Agent, or Firm*—Nixon & Vanderhye P.C.

(57) ABSTRACT

A read port for selectively coupling one of a plurality of inputs to an output is disclosed. The read port comprises: a plurality of inputs; an output; a plurality of multiplexers operable to selectively couple a selected input to said output; and a multiplexer control signal input for inputting a multiplexer control signal, the multiplexer control signal comprising a plurality of control parameters and being operable to control switching of the plurality of multiplexers. The plurality of multiplexers are arranged in a plurality of layers, the layers being arranged between the inputs and output, such that a selected input is operable to be coupled to the output via a multiplexer from each of the different layers. Furthermore, some of the layers are divided into portions, each portion having at least one control parameter input, so that each of the portions is operable to be controlled by a different one of the control parameters and multiplexers in one of the portions of a certain layers can be switched without switching multiplexers in another of the portions this layer. In some embodiments two outputs operable as two read ports are provided.

14 Claims, 3 Drawing Sheets

READ PORTS AND METHODS OF OUTPUTTING DATA VIA READ PORTS

BACKGROUND

The present invention relates to the field of data processors and more particularly, in certain preferred embodiments, to register read ports.

DESCRIPTION OF THE PRIOR ART

A register file read port allows the contents of a selected register from a register bank to be output at an output port. Typically, a register bank of say thirty two or sixty four registers is connected to an output using such a register file read port. This connection is generally achieved using a bank of multiplexers, arranged in layers between the input and output, control signals being used to switch the layers of multiplexers as appropriate.

FIG. 1a schematically shows a conventional register file read port for reading a register from an 8 register register bank. An 8 register register bank is used to provide a simple example although generally, read ports are used to address register banks of any size. In this example, there are seven 2:1 multiplexers arranged in three layers between the inputs and the output and a three bit control signal c1, c2, c3 controls the switching, one bit controlling the switching of each layer. The control signal c1, c2, c3 is shown on the left hand side, and in this example a 1 causes all the multiplexers in a layer to select their left hand input and a 0 causes them to select their right hand input. Thus, in the case illustrated register D is selected by inputting a 001 control signal as is illustrated in greater detail in FIG. 2a.

FIG. 2a shows a flow diagram illustrating the switching of the conventional read port of FIG. 1a. In this example a 001 control signal is input. The first 0 is input at c1 and controls the multiplexers in layer 1 and causes the four multiplexers in this layer to switch right, thus B and D are connected to multiplexer 2a and F and H are connected to multiplexer 2b. The second 0 is input at c2 and controls the multiplexers in layer 2 and causes them to switch right, thus D and H are connected to multiplexer 3a. The final 1 is input at c3 and controls layer 3 and causes multiplexer 3a to switch left thus connecting input D to the output, O. Thus, seven multiplexers switch in order for the value of D to be read. It should be noted that although the flow diagram shows the switching of the multiplexers in successive steps, this is only done for convenience of illustration and in reality the control values are applied approximately simultaneously to the multiplexers and they all switch more or less together.

A disadvantage of such a register file read port is that a large number of multiplexers are required and switching between inputs requires the switching of all of the multiplexers. This is very expensive on both processor area and power. Furthermore, the switching of all the multiplexers together results in a power glitch which can cause problems for a processing system.

SUMMARY OF THE INVENTION

Viewed from a first aspect the present invention provides a read port for selectively coupling one of a plurality of inputs to an output, said read port comprising: a plurality of inputs; an output; a plurality of multiplexers operable to selectively couple a selected input to said output; and a multiplexer control signal input for inputting a multiplexer control signal, said multiplexer control signal comprising a plurality of control parameters and being operable to control switching of said plurality of multiplexers; wherein said plurality of multiplexers are arranged in a plurality of layers, said plurality of layers being arranged between said plurality of inputs and said output, such that said selected input is operable to be coupled to said output via one of said plurality of multiplexers from each of said plurality of layers; and at least one of said plurality of layers is divided into portions, each portion comprising at least one of said plurality of multiplexers, and wherein each layer and each portion has at least one control parameter input, such that each of said portions is operable to be individually controlled by one of said control parameters and multiplexers in one of said portions of one of said layers can be switched without switching multiplexers in another of said portions of said one layer.

The present invention recognises and addresses the above problem of read ports consuming large amounts of dynamic power on switching between inputs. It addresses the problem by recognising that although all the multiplexers in a conventional register file read port switch, many of them do no useful work when they switch. The present invention addresses the above problem by dividing at least some of the layers into portions and providing separate control signals for the different portions. Thus, one portion of a layer can be controlled separately to another portion. By dividing the layers into portions and providing separate control for the different portions a suitable compromise between the width of the control signal and the number of multiplexers switching can be achieved. This can result in the switching of a significant number of multiplexers being inhibited when they are not required by the addition of only a small number of extra control signals. The number of multiplexers in a portion can be chosen depending on circumstances and this choice determines the size of the control signal and the number of multiplexers whose switching is inhibited. Thus, the present invention provides a convenient and effective way of reducing dynamic power consumption and power glitches of a read port without excessively increasing the width of the control signal.

In some embodiments, at least one of said portions comprises at least two of said plurality of multiplexers.

By having portions having multiple multiplexers, individual control lines for each multiplexers are not needed and thus, the number of control lines can be reduced, while still producing an increased degree of control over the conventional multiplexer bank.

Although the layers can be divided into various different sized fractions, the layers are preferably divided into fractions that are powers of two. For example, the layer adjacent to the output layer may be divided into halves and a subsequent layer may be divided into quarters and so on.

The layer next to the output often contains just a single multiplexer and thus cannot be divided into portions. In some embodiments, all of said layers except said layer adjacent to said output are divided into portions. In other embodiments there are other layers, particularly those near the output comprising fewer multiplexers, that are not divided into portions as well.

In some embodiments said layer adjacent to said output comprises at least two multiplexers and said read port comprises at least one further output, said output and said at least one further output being operable as at least two read ports.

In this embodiment additional read ports are provided by providing few additional multiplexers. This can be very advantageous, although it should be noted that the outputs will be restricted to some degree.

In some embodiments the layer adjacent to the output may contain a plurality of n multiplexers, n being any integer greater than one, and said read port comprises a corresponding plurality of n outputs, said n outputs being operable as a corresponding plurality of n restricted read ports, and wherein said n restricted read ports are arranged such that said n outputs are operable to be connected to selected inputs, such that each of said n outputs are operable to be connected either to one of said plurality of inputs connectable to multiplexers not lying in a portion of said layers containing a multiplexer connecting one of said other outputs to a selected input, or to one of said selected inputs.

In this embodiment, n−1 additional multiplexers provides n−1 additional read ports, albeit restricted read ports.

In preferred embodiments, said layer adjacent to said output comprises two multiplexers and said read port comprises said output and said further output, said two outputs being operable as two restricted read ports, and wherein a first of said two outputs is operable to be connected to a selected first input, and a second of said two outputs is operable to be connected either to one of said plurality of inputs connectable to multiplexers not lying in a portion of said layers containing a multiplexer connecting said selected first input to said first output, or to said selected first input.

In this embodiment, one additional multiplexer provides an additional read port, The additional second output is restricted to output inputs from different portions of the layers to those output by the first output or to output the same input as is output by the first output. Thus, an extra read port is provided and although it is a restricted read port, there are some situations where certain restrictions on the inputs is not a problem. In these situations this embodiment provides an additional read port for the price of a multiplexer.

Although the plurality of inputs can comprise a number of different things such as data buses they preferably comprise the registers of a register bank.

Advantageously, said layers are divided into two portions, a first portion being connectable to even numbered registers and a second portion being connectable to odd numbered registers.

In this embodiment an additional output is provided for the price of a multiplexer, one output providing access to even registers and the other to odd registers. This embodiment can be useful in certain multipliers and in these situations where the restriction to even and odd registers is acceptable an additional useful output is provided for the price of a single multiplexer, a highly advantageous arrangement.

Viewed from a second aspect the present invention provides a method of outputting one of a plurality of inputs via an output of a read port, comprising: arranging a plurality of multiplexers in a plurality of layers between a plurality of inputs and an output, and dividing at least one of said plurality of layers into portions, each portion comprising at least one of said plurality of multiplexers; inputting a multiplexer control signal to control switching of said plurality of multiplexers in order to selectively couple a selected input to said output via one of said plurality of multiplexers from each of said plurality of layers; wherein said multiplexer control signal comprises a plurality of control parameters and at least one of said plurality of control parameters is input to each layer and each portion, such that each of said portions is operable to be individually controlled by one of said control parameters and said multiplexers in one of said portions of one of said layers can be switched without switching said multiplexers in another of said portions of said one layer.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2a illustrates a flow diagram showing the switching of the conventional register file read port shown in FIG. 1a;

FIG. 2b illustrates a flow diagram showing the switching of the register file read port according to an example embodiment shown in FIG. 1a;

DESCRIPTION OF THE PREFERRED EMBODIMENTS

Figure 1A:
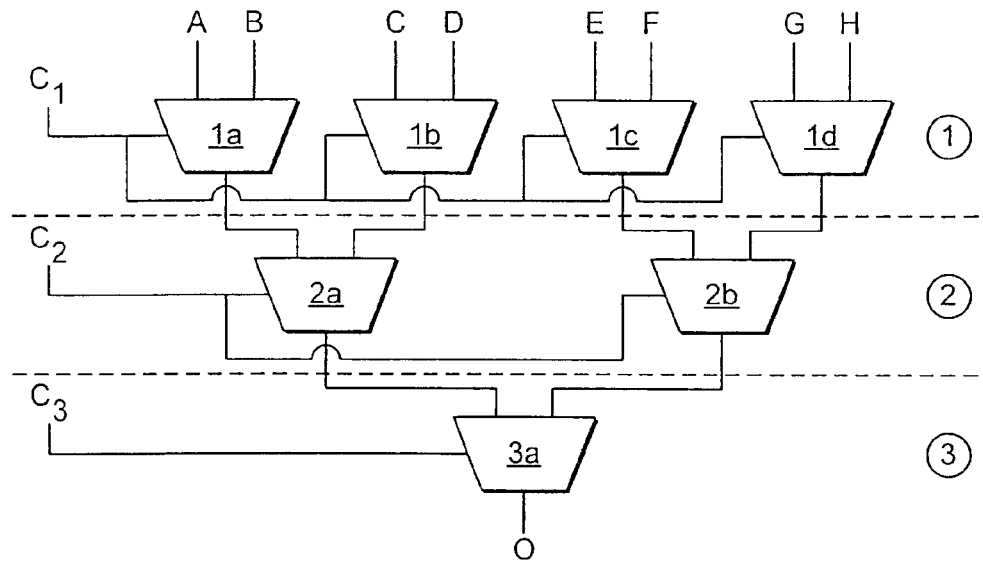
FIG. 1a schematically shows a simple example of a conventional register file read port.
Figure 1B:
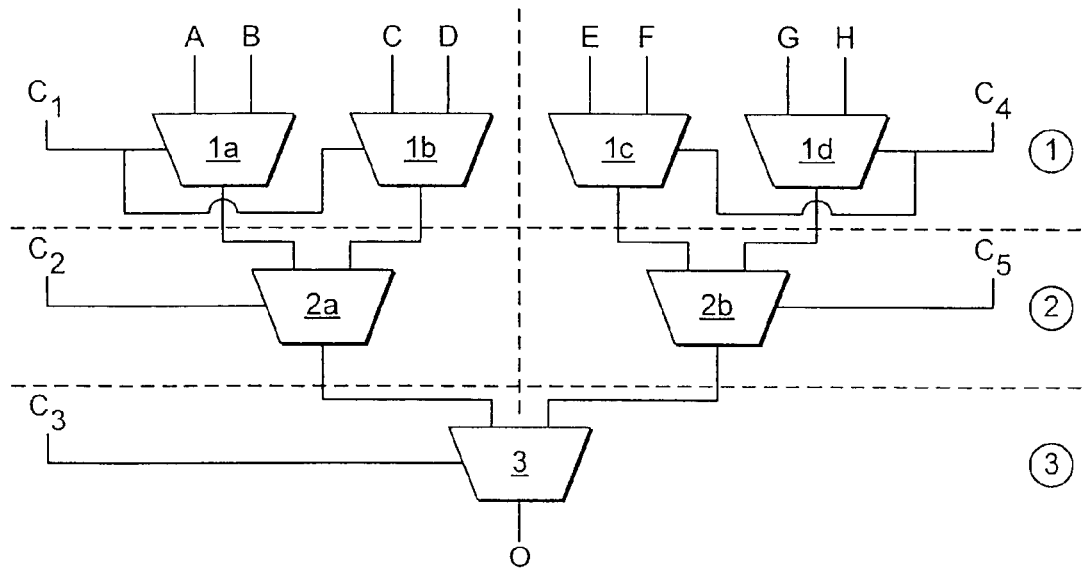
FIG. 1b schematically shows a simple example of a register file read port according to an example embodiment.

FIG. 1b schematically shows a simple example of a register file read port for reading a register from an 8 register register bank according to an example embodiment. Although an 8 register register is shown in this simple example, typically a register file read port addresses a thirty two or sixty four register register bank and can address a register bank of any size.

In this simple example, there are seven 2:1 multiplexers arranged in three layers between the inputs and the output. The embodiment is similar to the conventional example of FIG. 1a except that layers 1 and 2 are divided into portions (halves) and each half is controlled independently of the other half. Thus, in this embodiment there is a five bit control signal $c_1$, $c_2$, $c_3$, $c_4$, $c_5$ to control switching of the read port. The control signal $c_1$, $c_2$, $c_3$ for the left hand portion of layer 1 and 2 and for layer 3 is shown on the left hand side, and the control signal $c_4$, $c_5$ for the right hand portion of layer 1 and 2 is shown on the right hand side.

It should be noted that the multiplexers may be formed in a number of different ways including being built of discrete gates. Furthermore, although a multiplexer is shown here having 2 inputs to 1 output for ease of illustration, multiplexers having n inputs to 1 output are envisaged.

Figure 2A:
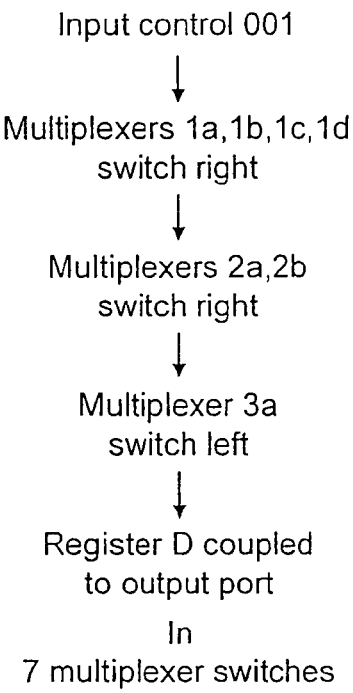
Figure 2B:
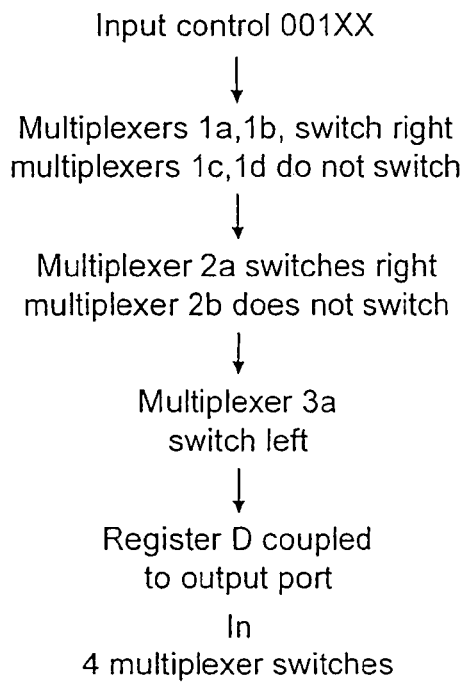

FIG. 2b shows a flow diagram illustrating the switching of the read port according to the example embodiment illustrated in FIG. 1b. In this example a 001XX control signal is input at $c_1$, $c_2$, $c_3$, $c_4$, $c_5$ respectively. The XX means that for this example it does not matter what the value of the last two control bits is as the switching of the multiplexers controlled by these signals does not affect the reading of register D and as such they are generally left at the value that they had for the previous switching, so that the multiplexers they control (1c, 1d and 2b) do not switch. The first 0 input at $c_1$ controls the multiplexers on the left hand side of layer 1 and causes multiplexers 1a and 1b to switch right. Thus B and D are connected to multiplexer 2a. As the control bit $c_4$ controlling the right hand side of this layer has not changed multiplexers 1c and 1d do not switch. The second 0 input at $c_2$ controls the multiplexers on the right hand side of layer 2 and causes it to switch right, thus D is connected to multiplexer 3a. The control bit, $c_5$, controlling multiplexer 2b has not changed in value since the previous switching and thus it does not switch. The final 1 input at $c_3$, controls layer 3 and causes multiplexer 3a to switch left thus connecting input D to the output. Thus, in this embodiment four multiplexers switch in order for the value of D to be read. It should be noted that although the flow diagram shows the switching of the multiplexers in successive steps, this is only done for convenience of illustration and in reality the control values are applied approximately simultaneously to the multiplexers and they all switch together.

In the simple example given above, the dividing of the layers into portions and the use of additional control bits reduces the number of multiplexers that switch from 7 to 4. In effect many of the multiplexers that are not doing useful work are not switched and thus do not consume any unnecessary dynamic power (assuming no register writes). Thus, in the above example multiplexers on the right hand side in the first two layers keep their previous value when the read port is reading register D. Thus, less power is required to drive the system and there is also a reduction in any power glitches. In a register read port operable to read a larger register file, there will be many more multiplexers and the dividing of the layers into portions will have a correspondingly larger effect on the number of multiplexers that no longer need to switch and thus a larger power saving will be seen. In the example given the multiplexers shown are 2:1 multiplexers, in embodiments of the invention other multiplexers such as 4:1 or 8:1 may be used.

Figure 3:
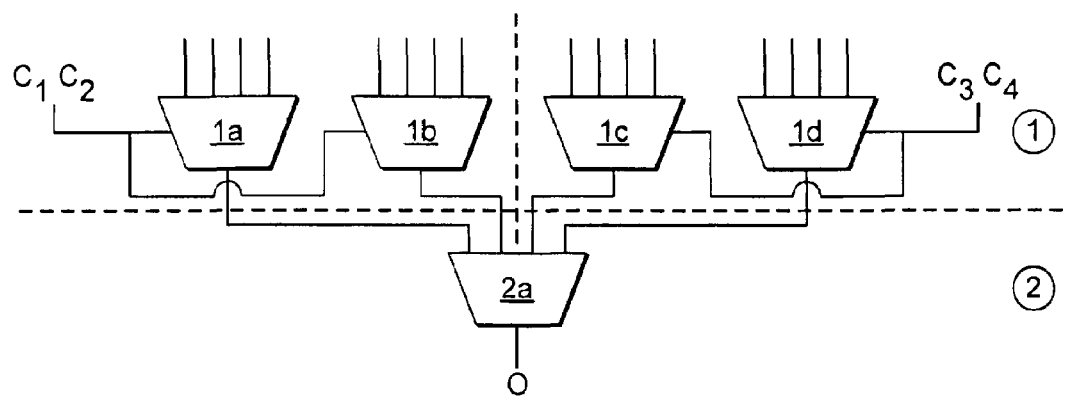
FIG. 3 shows a simple example of a 16 register register file read port having 4:1 multiplexers according to an example embodiment.

FIG. 3 shows a simple example of a 16 register register file read port comprising 4:1 multiplexers according to an example embodiment. In this very simple example there are four 4:1 multiplexers each controlled by a 2-bit control signal. Layer 1 is divided into two portions thus control signal c1, c2 controls multiplexers 1a and 1b and control signals c3, c4 controls multiplexers 1c and 1d. Thus, in this embodiment multiplexers 1a and 1b can be controlled separately to multiplexers 1c and 1d and thus 3 multiplexers are required to switch when an input is to be selected rather than the 5 as would be needed in a similar conventional read port.

Figure 4:
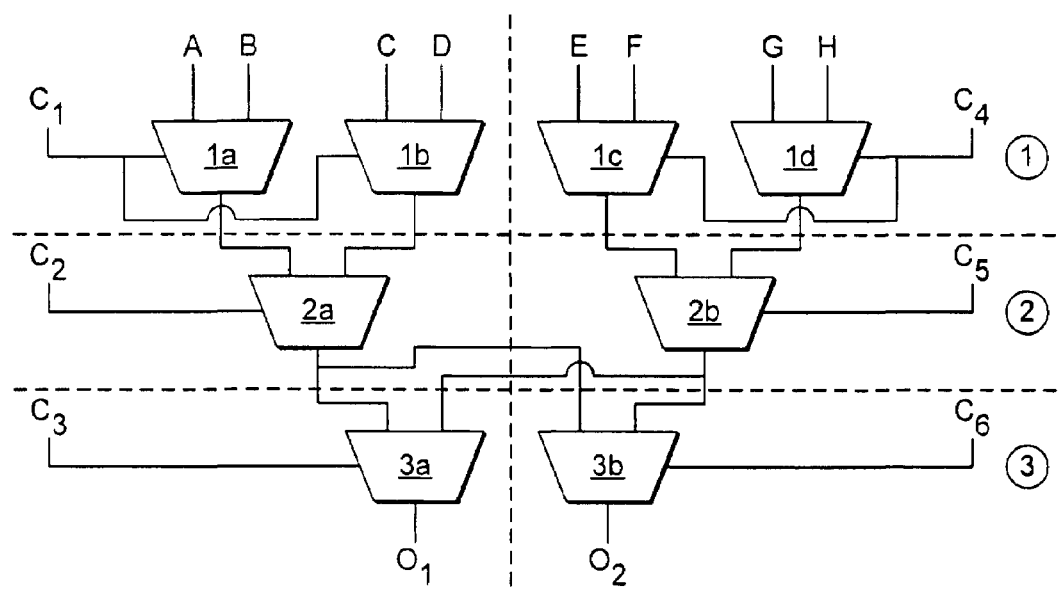
FIG. 4 shows two restricted read ports according to an example embodiment.

FIG. 4 shows two "restricted" read ports according to an example embodiment. Once again a simple example of an 8 register register file and 2:1 multiplexers are used for ease of illustration. -This register file read port is very similar to that of FIG. 1b, except that there is an additional multiplexer 3b in layer 3 and there are two outputs O1 and O2. In this example, there is also an additional control bit C6 in layer 3 which means that the two multiplexers 3a and 3b in layer three can be individually controlled.

In this example, an additional read port is gained for the price of a 2:1 multiplexer. However the additional read port is a restricted read port in that if output O1 selects the left hand portions, i.e. C3=1, then generally O2 will select the right hand side portions C6=0. This means that O1 can output any one of A, B, C, or D, while O2 can output any one of E, F, G, H. Thus, if for example the registers are arranged so that A to D are the even numbered registers and B to H are the odd register numbers then O1 will be able to read an even register and O2 an odd register, and vice versa if the multiplexers in the final layer are switched the other way round. Although it is generally more useful for C3 and C6 to have different values it is not necessary. When C3=C6, then O1 outputs the same register as O2.

The above embodiment can be used in a plurality of situations including in a multiplier. For example in situations where two accumulator registers need to be read, it is sometimes acceptable to place a restriction on the registers used (i.e. one odd register and one even register).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims can be made with the features of the independent claims without departing from the scope of the present invention.

I claim:

1. A read port for selectively coupling one of a plurality of inputs to an output, wherein said plurality of inputs includes the registers of a register bank, said read port comprising:
a plurality of inputs;
an output;
a plurality of multiplexers for selectively coupling a selected input to said output; and
a multiplexer control signal input for inputting a multiplexer control signal, said multiplexer control signal comprising a plurality of control parameters and controlling switching of said plurality of multiplexers; wherein
said plurality of multiplexers are arranged in a plurality of layers, said plurality of layers being arranged between said plurality of inputs and said output, such that said selected input is operable to be coupled to said output via one of said plurality of multiplexers from each of said plurality of layers; and
at least one of said plurality of layers is divided into portions, each portion comprising at least one of said plurality of multiplexers, and wherein each layer and each portion has at least one control parameter input, such that each of said portions is individually controlled by one of said control parameters, at least one of said control parameters controlling more than one multiplexer, and multiplexers in one of said portions of one of said layers can be switched without switching multiplexers in another of said portions of said one layer,
wherein at least one of said portions comprises at least two of said plurality of multiplexers.

2. A read port according to claim 1, wherein said portions of said plurality of layers comprise fractions that are powers of two.

3. A read port according to claim 1, wherein all of said layers except said layer adjacent to said output are divided into portions.

4. A read port according to claim 1, wherein said layer adjacent to said output comprises at least two multiplexers and said read port comprises at least one further output, said output and said at least one further output operating as at least two read ports.

5. A read port according to claim 4, wherein said layer adjacent to said output comprises a plurality of n multiplexers, and said read port comprises a corresponding plurality of n outputs, said n outputs operating as a corresponding plurality of n restricted read ports, and wherein said n restricted read ports are arranged such that inputting said multiplexer control signal causes said n outputs to be connected to selected inputs, such that each of said n outputs is connected either to one of said plurality of inputs connectable to multiplexers not lying in a portion of said layers containing a multiplexer connecting one of said other outputs to a selected input, or to one of said selected inputs.

6. A read port according to claim 5, wherein said layer adjacent to said output comprises two multiplexers and said read port comprises two outputs, said two outputs operating as two restricted read ports, and wherein inputting said multiplexer control signal causes a first of said two outputs to be connected to a selected first input, and a second of said two outputs to be connected either to one of said plurality of inputs connectable to multiplexers not lying in a portion of said layers containing a multiplexer connecting said selected first input to said first output, or to said selected first input.

7. A read port according to claim 6, wherein said layers are divided into two portions, a first portion being connectable to even numbered registers and a second portion being connectable to odd numbered registers.

8. A method of outputting one of a plurality of inputs via an output of a read port, said plurality of inputs includes the registers of a register bank, comprising:
   arranging a plurality of multiplexers in a plurality of layers between a plurality of inputs and an output, and dividing at least one of said plurality of layers into portions, each portion comprising at least one of said plurality of multiplexers;
   inputting a multiplexer control signal to control switching of said plurality of multiplexers in order to selectively couple a selected input to said output via one of said plurality of multiplexers from each of said plurality of layers; wherein
   said multiplexer control signal comprises a plurality of control parameters and at least one of said plurality of control parameters is input to each layer and each portion, such that each of said portions is individually controlled by one of said control parameters, at least one of said control parameters controlling more than one multiplexer, and said multiplexers in one of said portions of one of said layers can be switched without switching said multiplexers in another of said portions of said one layer,
   wherein at least one of said portions comprises least two of said plurality of multiplexers.

9. A method according to claim 8, wherein said portions of said plurality of layers comprise fractions that are powers of two.

10. A method according to claim 8, comprising dividing all of said layers except said layer adjacent to said output into portions.

11. A method according to claim 8, comprising arranging at least two multiplexers in said layer adjacent to said output such that at least one further output is provided, said output and said at least one further output being operable as at least two read ports.

12. A method according to claim 11, wherein said layer adjacent to said output comprises a plurality of n multiplexers, and said read port comprises a corresponding plurality of n outputs, said n outputs operating as a corresponding plurality of n restricted read ports, and wherein said n restricted read ports are arranged such that inputting said multiplexer control signal causes said n outputs to be connected to selected inputs, such that each of said n outputs is connected either to one of said plurality of inputs connectable to multiplexers not lying in a portion of said layers containing a multiplexer connecting one of said other outputs to a selected input, or to said selected first input.

13. A method according to claim 12, wherein said layer adjacent to said output comprises two multiplexers and said read port comprises two outputs, said two outputs operating as two restricted read ports, wherein inputting said multiplexer control signal causes a first of said two outputs to be connected to a first selected input and a second of said two outputs to be connected either to one of said plurality of inputs connectable to multiplexers not lying in a portion of said layers containing a multiplexer connecting said first selected input to said first output, or to said first selected input.

14. A method according to claim 13 wherein said layers are divided into two portions, a first portion being connectable to even numbered registers and a second portion being connectable to odd numbered registers.

* * * * *